June 27, 1967 E. L. COPONY ET AL 3,327,357
HOSE CLAMPING DEVICE
Filed July 27, 1965 2 Sheets-Sheet 1
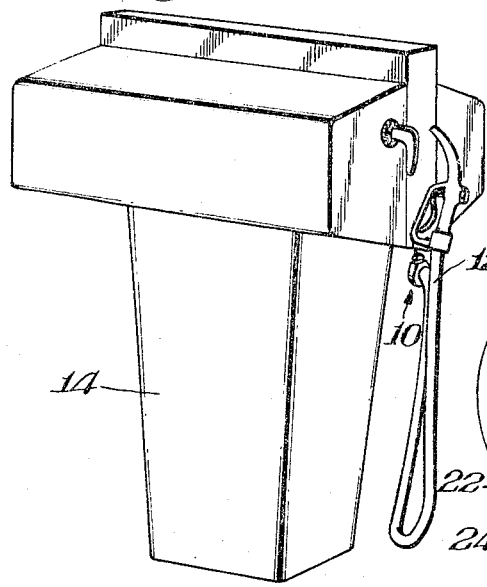
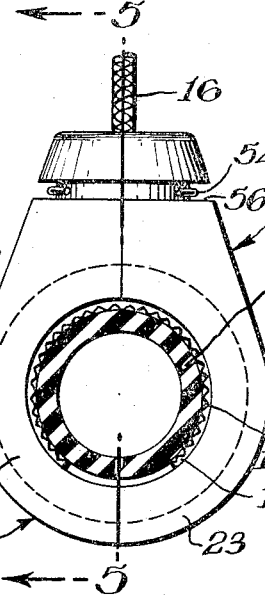
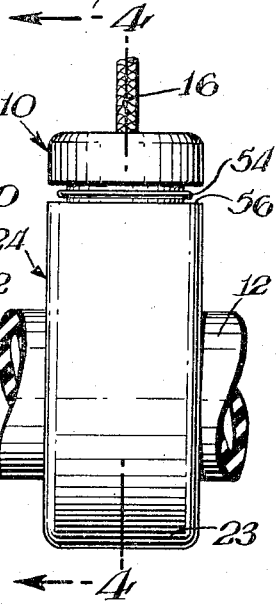
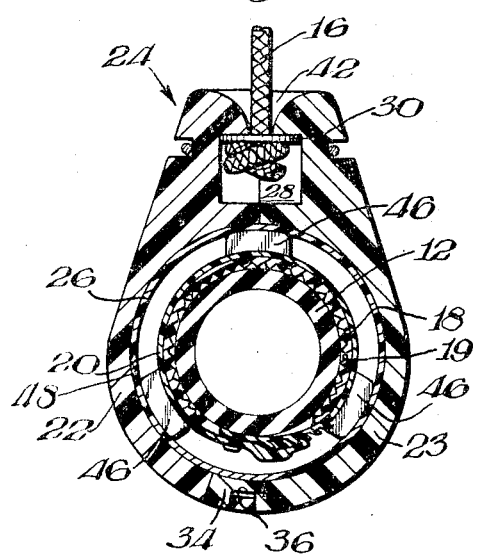
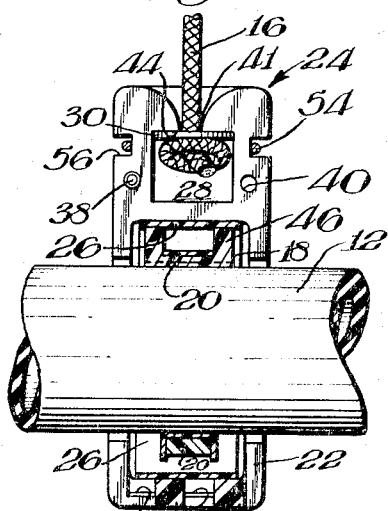
INVENTORS
Edward L. Copony
George M. Staples, III
Robert M. Riordan
BY Connolly and Hutz
ATTORNEYS

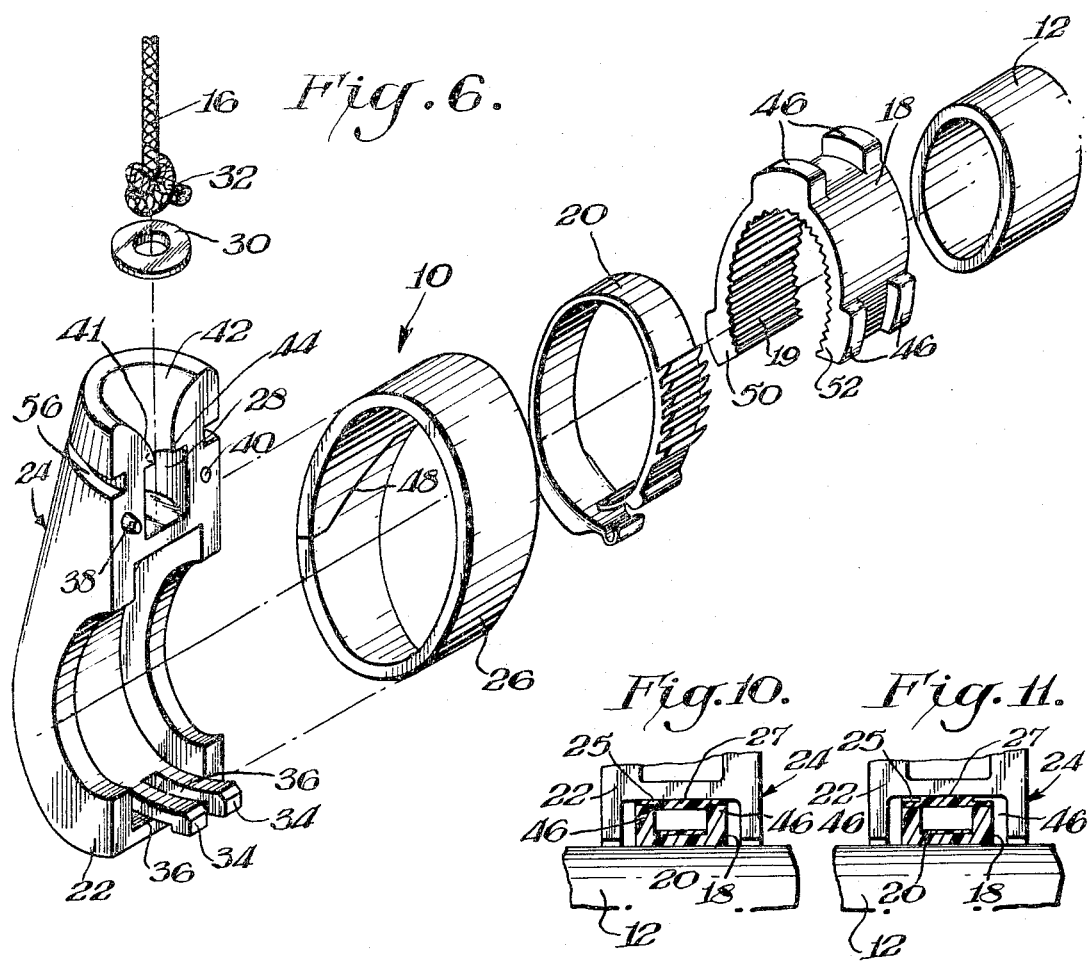

United States Patent Office 3,327,357
Patented June 27, 1967

1

3,327,357
HOSE CLAMPING DEVICE
Edward L. Copony, George M. Staples III, and Robert M. Riordan, Salisbury, Md., assignors to Symington Wayne Corporation, Salisbury, Md., a corporation of Maryland
Filed July 27, 1965, Ser. No. 475,211
17 Claims. (Cl. 24—16)

This invention relates to a hose clamping device for a dispensing hose of a liquid dispenser, and more particularly to such dispensers which are commonly used in automobile service stations.

Gasoline dispensers employ a hose clamping device which connects the retriever cable of the dispenser to the delivery hose. It is important in such arrangements that the possibility of the hose and cable becoming twisted be minimized. One such attempt is shown for example in U.S. Patent 3,143,367. It is advantageous in such arrangements to provide such a hose clamping device which is capable of being secured to different diameter hoses. Additionally, it is desirable that the hose clamping device minimizes wear of the retriever cable.

An object of this invention is to provide a simple and economical hose clamping device which may be secured to various diameter hoses.

A further object is to provide such a device which does not adversely affect the wear life of the retriever cable.

In accordance with this invention, the hose clamping device includes a hose securing means which is capable of engaging different diameter hoses. This hose securing means includes a track with a collar mounted about the track for rotation about the hose axis and with the retriever cable being anchored in one side of the collar. The hose securing means is capable of engaging different diameter hoses by for example being in the form of an arcuate inner member which has a pair of free ends spaced from each other. Accordingly, the inner member can be distended to engage different diameter hoses. The hose engaging face of the inner wall may be serrated to positively grip the hose.

The collar may be in the form of a pair of identical members each having a semi-circular groove for receiving the inner member. The collar members include a recess at one end for forming the cable receiving cavity. Advantageously, the entrance to the recess is rounded off to eliminate sharp bends or edges and thus minimize the wear of the cable.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention;

FIG. 2 is a front view in elevation and partially in section of the hose clamping device shown in FIG. 1;

FIG. 3 is a side view of the hose clamping device shown in FIG. 2;

FIG. 4 is a cross sectional view taken through FIG. 3 along the line 4—4;

FIG. 5 is a cross sectional view taken through FIG. 2 along the line 5—5;

FIG. 6 is an exploded view of the hose clamping device shown in FIGS. 1–5;

FIGS. 7–9 are plan, side and end views, respectively, of a modified spacer sleeve in accordance with this invention; and FIGS. 10–11 are fragmentary views in section of the spacer sleeve of FIGS. 7–9 in different phases of operation.

2

In FIG. 1 is shown a gasoline dispenser incorporating the hose clamping device 10 which is secured to the hose 12 of dispenser 14.

FIG. 6 is an exploded view of some of the various elements which make up clamping device 10. These elements include an inner clamping means and an outer collar. As most clearly shown in FIG. 6, the inner clamping means includes arcuate ring 18, band clamp 20 and spacer ring or sleeve 26. Inner member 18 is in the form of an open plastic ring of approximately 240° and having a pair of free ends 50, 52. The inner surface 19 of ring 18 is serrated to provide for positive gripping of hose 12. For engaging small diameter hoses, ring 18 is introduced on the hose with free ends 50 and 52 moved closer together. Conversely for larger diameter hoses the ring is distended with free ends 50 and 52 moved further apart. Accordingly, the flexibility of this ring 18 permits easy introduction over any circular cross sectional hose or tubing. Inner member 18 is clamped to hose 12 by means of adjustable band clamp 20, which is disposed between the pairs of bearing tabs 46 of inner member 18.

Spacer ring 26 is then slipped over the outermost edges of bearing tabs 46 as most clearly shown in FIGS. 4–5. Advantageously spacer ring 26 has a slit 48 extending completely there across so that ring 26 may be opened permitting easy insertion over the hose. The ring 26 is formed such that the ends forming slit 48 tend to separate so that when the clamped assembly and spacer ring are inserted within internally grooved collar 24 as shown in FIGS. 4 and 5, the spacer ring will position itself against the internal groove of collar 24. Spacer ring 26 thus takes up the play that would otherwise be encountered by changing the shape of inner clamping member 18 to accommodate different diameter hoses. By this arrangement inner ring 18 revolves within spacer ring 26 permitting 360° of rotation about the axis of hose 12.

With certain diameter hoses the inclusion of spacer ring 26 is not necessary. Thus if hose 12 is of such diameter that with the clamp assembled on it, tabs 46 ride in the groove of collar 24 with a minimum clearance, a spacer ring is not necessary.

FIGS. 7–9 show another form of spacer sleeve 25. As indicated therein, out of assembly, spacer 25 is flat having a T-cross-section with a narrow leg 27. In assembly strip 25 is bent around inner member 18 (as shown in FIGS. 10–11) and retained in this configuration by collar 24. The T-cross-section is particularly advantageous in that it provides a two-in-one effect. For example, where small play would be encountered, for example in going from a 1″ hose to a ¾″ hose, spacer 25 is disposed as shown in FIG. 10 with its leg 27 facing toward inner member 18. Accordingly, bearing tabs 46 straddle narrow section or leg 27 and bear on the wider section of the T. This thereby forms a thin spacer. Conversely, where greater play would be encountered, for example in going from a ¾″ hose to a ⅝″ hose, spacer 25 is disposed as shown in FIG. 11. In this disposition narrow section or leg 27 faces away from inner member 18 and acts as a bearing surface against collar 24, thereby forming a spacer with a thickness equal to the overall dimension of the T-cross-section.

Collar 24 is made in the form of a pair of identical housing members 22 and 23 made, for example, of a plastic material. Members 22 and 23 are hinged together by opposed projections 34 and recesses 36. Additionally, members 22 and 23 include tapered aligning pins 38 and holes 40. During assembly, after inner member 18, and clamp 20 have been secured on the hose 12, and spacer ring 26 (or 25) introduced over bearing tabs 46 of inner member 18, and after retriever cable 16 (as later described) has been inserted through washer 30 to knotted end 32, members 22 and 23 are snapped together in the wide open position with hinge projections 34 and grooves 36 mating. The members 22 and 23 are then closed so that pins 38 and holes 40 mate. Members 22 and 23 are then held together by snap ring 54 disposed in external groove 56.

The ends of members 22 and 23 opposite hinges 34, 36 also have opposed recesses which, in the assembled form comprise cable receiving cavity 28 which has a passageway 41 leading thereto. Cable 16 is anchored in cavity 28, by for example, inserting the free end 32 of cable 16 through washer 30 and then knotting the free end. In assembled form washer 30 abuts against shoulder 44 to firmly anchor the cable in collar 24. Cable 16 may also be anchored in collar 24 by, for example, affixing a ferrule to end 32.

As most clearly shown in FIG. 6 the entrance 42 of the passageway 41 leading to cavity 28 is rounded off at the point where cable 16 enters collar 24. This rounding off or relief provides the radius to which cable 16 will conform, which in turn eliminates sharp bends or edges which otherwise tend to cause undue wear of the cable.

Where the passageway 41 leading to the cavity 28 is made larger than cable 16, it is possible for the cable 16 to rotate about its axis, thus providing an additional flexibility of movement to the arrangement.

What is claimed is:

1. A hose clamping device comprising hose securing means including a track, a collar mounted around said track for rotation about the hose axis, means for anchoring a retriever cable in one side of the said collar, said hose securing means including means for engaging different diameter hoses comprising an arcuate inner member for securement to the hose, said inner member having a pair of free ends normally spaced from each other, and adjusting means for determining the spacing between said ends in accordance with the hose diameter to which said inner member is to be secured.

2. A device as set forth in claim 1 wherein the hose engaging face of said inner member is serrated to provide positive gripping means of the hose.

3. A hose clamping device comprising hose securing means including a track, a collar mounted around said track for rotation about the hose axis, means for anchoring a retriever cable in one side of said collar, said hose securing means for engaging different diameter hoses comprising an arcuate inner member for securement to the hose, said inner member having a pair of free ends normally spaced from each other, said spacing being determined by the hose diameter to which said inner member is to be secured said collar being a hollow housing disposed about said inner member, and a spacer sleeve being between said inner member and said housing to minimize play therebetween.

4. A device as set forth in claim 3 wherein said sleeve is a resilient member having a slit extending completely there across whereby the diameter of said sleeve may be varied.

5. A device as set forth in claim 3 wherein said sleeve in its unassembled form is a flat strip having a T-cross-section.

6. A device as set forth in claim 1 wherein said collar comprises a pair of bracket members, each of said bracket members having a semi-circular groove, and aligning pins and grooves being in said bracket members for maintaining said bracket members aligned with said hose securing means disposed in said semi-circular grooves.

7. A device as set forth in claim 6 wherein each of said bracket members includes an extended portion having a recess therein, the recess in said extended portions being opposed to form a cable receiving cavity, said extended portions having a groove leading to said cavity and said extended portions being rounded off at the groove entrance for eliminating sharp edges to minimize the wear of the cable.

8. A device as set forth in claim 7 wherein one end of the cable extends through said grove into said cavity, said end being knotted, and a washer being disposed around said cable between said knotted end and said groove to anchor said cable in said cavity.

9. A device as set forth in claim 8 wherein said groove is larger than said cable whereby said cable may rotate about its axis.

10. A device as set forth in claim 1 wherein said inner member has pairs of outwardly extending bearing tabs, and means for adjusting the spacing between said free ends of said inner member comprising a band clamp disposed around said inner member between said bearing tabs.

11. A device as set forth in claim 10 wherein a spacer sleeve is disposed against said bearing tabs, and said inner member normally being an open ring of approximately 240°.

12. A device as set forth in claim 11 wherein said spacer sleeve has a T-cross-section with a narrow intermediate section, and said narrow intermediate section being between said bearing tabs facing toward said inner member.

13. A device as set forth in claim 11 wherein said spacer sleeve has a T-cross-section with a narrow intermediate section, and said narrow intermediate section facing away from said inner member.

14. A hose clamping device comprising hose securing means, a collar mounted around said hose securing means, said collar being in the form of a two-piece housing, each piece being identical to the other piece, said pieces being internally peripherally grooved, the grooves rotatably receiving said hose securing means, hinge means at one end of said housing, said hinge means having opposed grooves and projections, fastening means at the other end of the housing for holding the housing in assembled relationship, said pieces having opposed recesses forming a cable receiving cavity at the end of said bracket opposite said hinge means, a cable passageway leading to said cavity, and the entrance to said cavity being free of sharp edges to minimize wear of the cable.

15. A device as set forth in claim 14 wherein said pieces are provided with aligning pins and holes, an external groove being completely around the portion of said housing remote from said hinge means, and a snap ring being in said external groove for holding said pieces together.

16. A device as set forth in claim 15 wherein a retriever cable extends through said passageway and into said cavity, said retriever cable being knotted, and a washer being between the knotted portion of the retriever cable and said passageway for securing and anchoring said retriever cable in said cavity.

17. A device as set forth in claim 16 wherein said passageway is larger than said retriever cable whereby said cable may rotate about its axis.

References Cited

UNITED STATES PATENTS

| 1,003,787 | 9/1911 | Peppin. | |
| 1,326,392 | 12/1919 | Combs | 285—197 |
| 1,517,544 | 12/1924 | Draver | 285—197 X |
| 1,895,827 | 1/1933 | Van Hecke | 285—197 X |
| 3,006,047 | 10/1961 | Wright et al. | 24—16 |

JAMES L. JONES, Jr., *Primary Examiner.*